United States Patent
Bai et al.

(10) Patent No.: US 11,143,514 B2
(45) Date of Patent: Oct. 12, 2021

(54) SYSTEM AND METHOD FOR CORRECTING HIGH-DEFINITION MAP IMAGES

(71) Applicant: GM GLOBAL TECHNOLOGY OPERATIONS LLC, Detroit, MI (US)

(72) Inventors: Fan Bai, Ann Arbor, MI (US); Hansi Liu, Highland Park, NJ (US); David A. Craig, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 16/249,969

(22) Filed: Jan. 17, 2019

(65) Prior Publication Data

US 2020/0232800 A1 Jul. 23, 2020

(51) Int. Cl.

| | |
|---|---|
| *G01C 21/32* | (2006.01) |
| *G06T 3/00* | (2006.01) |
| *G06T 7/38* | (2017.01) |
| *G06T 5/50* | (2006.01) |
| *G06T 7/33* | (2017.01) |
| *G06K 9/62* | (2006.01) |
| *G06T 11/60* | (2006.01) |
| *G06T 7/60* | (2017.01) |
| *G06T 15/00* | (2011.01) |

(52) U.S. Cl.
CPC ........... *G01C 21/32* (2013.01); *G06K 9/6202* (2013.01); *G06K 9/6228* (2013.01); *G06T 3/00* (2013.01); *G06T 5/50* (2013.01); *G06T 7/33* (2017.01); *G06T 7/38* (2017.01); *G06T 7/60* (2013.01); *G06T 11/60* (2013.01); *G06T 15/00* (2013.01); *G06T 2207/10016* (2013.01); *G06T 2207/10028* (2013.01); *G06T 2207/20221* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2018/0107210 A1* | 4/2018 | Harnett | B64D 47/02 |
| 2019/0204092 A1* | 7/2019 | Wheeler | G05D 1/0246 |

* cited by examiner

*Primary Examiner* — Mohammad H Ghayour
*Assistant Examiner* — Pawan Dhingra
(74) *Attorney, Agent, or Firm* — Lorenz & Kopf LLP

(57) ABSTRACT

A system for correcting HD map images is provided. The system is configured to: receive, from a plurality of vehicles, ground view image data of a map anomaly hotspot captured by the vehicles; convert the ground view image data to bird view image data using homography; remove outliers from the bird view image data; apply an error reduction algorithm; stitch together a sequence of consecutive images from the image data after error reduction to produce a high-definition image, wherein each of the consecutive images has been generated through converting ground view image data to bird view image data using homography, removing outliers from the bird view image data, and applying an error reduction algorithm; compare the stitched sequence of consecutive images to a high-definition image of the hotspot to determine revisions to the high-definition image; and provide revised high-definition image data for use in navigating near the map anomaly hotspot.

20 Claims, 9 Drawing Sheets

SYSTEM AND METHOD FOR CORRECTING HIGH-DEFINITION MAP IMAGES

BACKGROUND

The present disclosure generally relates to systems and methods for correcting maps, and more particularly relates to systems and methods for correcting mapping data for autonomous vehicle maps.

Navigation level maps, such as OpenStreetMap (OSM) and Google maps, are not suitable for autonomous vehicle (AV) driving. To navigate, an autonomous vehicle may need a high-definition map of the area in which the vehicle will travel. The high-definition map may need to be three-dimensional, annotated with the permanent fixed objects in the area, and include every road in an area to be navigated with the precise location of every stop sign, all the lane markings, every exit ramp and every traffic light.

Creating AV maps can be complex. There are more than four million miles of roads in the United States, and compared with the maps used by GPS and navigation systems, the level of precision for AV maps is much greater. Navigational maps typically locate a vehicle's position within several yards. AV maps, in some cases, may need to be able to locate the position of vehicles, curbs and other objects within about four inches.

Autonomous vehicles operating in an autonomous driving mode rely on mapping data that was gathered sometime in the past. The mapping data may not always reflect the actual environment it is intended to depict. The mapping data may contain errors or become stale due to environmental changes such as road construction.

Autonomous vehicles and non-autonomous vehicles have various sensors that may be used to sense the actual environment. For example, vehicles may be equipped with perception systems containing sensing devices such as radar, lidar, image sensors, and others. The perception systems and other sensing systems may be available to provide sensing data for use in verifying the accuracy of mapping data for AV maps.

Accordingly, it is desirable to provide systems and methods for correcting AV mapping data. Furthermore, other desirable features and characteristics of the present invention will become apparent from the subsequent detailed description and the appended claims, taken in conjunction with the accompanying drawings and the foregoing technical field and background.

SUMMARY

Systems and method are provided for using crowd-sensing technology to identify a map anomaly hotspot and provide more detailed imagery information (e.g., two-dimensional bird view or three-dimensional scene reconstruction). The detailed imagery information is obtained through synthesizing a number of collected sequential Ground View images from a large fleet of vehicles at the map anomaly hotspot.

In one embodiment, a system for correcting high-definition map images is provided. The system includes one or more processors configured by programming instructions encoded on non-transient computer readable media. The system is configured to: receive, by a cloud-based processor from a plurality of vehicles, ground view image data of a map anomaly hotspot captured by the vehicles, wherein the map anomaly hotspot is an area described by a high-definition map at which physical characteristics of the hotspot as observed by the vehicles are inconsistent with the description for the area provided by the high-definition map; convert the ground view image data to bird view image data using homography; remove outliers from the bird view image data; apply an error reduction algorithm for error reduction to the bird view image data with the removed outliers; stitch together a sequence of consecutive images from the bird view image data after error reduction to produce a high-definition bird view image, wherein each of the consecutive images has been generated through converting ground view image data to bird view image data using homography, removing outliers from the bird view image data, and applying an error reduction algorithm for error reduction; compare the stitched sequence of consecutive images to a high-definition image of the hotspot to determine revisions to the high-definition image; and provide revised high-definition image data to an autonomous vehicle for use in navigating in an area near the map anomaly hotspot.

In one embodiment, the system is further configured to: receive a report, from a vehicle, of a map anomaly hotspot that includes ground view image data at the map anomaly hotspot; instruct a plurality of vehicles in an area near the map anomaly hotspot to upload ground view image data at the map anomaly hotspot; and receive ground view image data of the map anomaly hotspot captured by the plurality of vehicles.

In one embodiment, to convert the ground view image data to bird view image data using homography, the system is configured to: calculate a perspective transform from 4 pairs of corresponding corner points; represent the prospective transform by a transform matrix M; and apply the estimated perspective transform matrix M to the ground view image data.

In one embodiment, to remove outliers from the bird view image data the system is configured to apply a RANSAC (Random Sample Consensus) algorithm or similar algorithms achieving the same purpose to remove outliers from the bird view image data.

In one embodiment, to apply an error reduction algorithm, the system is configured to perform image registration by matching features in the bird view image with features in the high-definition image or using direct alignment methods to search for image alignments that minimize the sum of absolute differences between overlapping pixels.

In one embodiment, to apply an error reduction algorithm, the system is configured to apply an iterative closest point (ICP) algorithm to iteratively revise the homography transformation used to reduce an error metric between the bird view image with outliers removed to the satellite image with outliers removed.

In one embodiment, to stitch a sequence of consecutive images together, the system is configured to: determine the appropriate mathematical model relating pixel coordinates in one image to pixel coordinates in another; estimate the correct alignments relating collections of images; match distinctive features in each image to establish correspondences between images; and merge the overlapping images.

In one embodiment, to compare the stitched sequence of consecutive images to a satellite image of the hotspot to determine revisions to the satellite image, the system is configured to: add a feature from the stitched image to the satellite image when it is determined that the feature exists in the stitched image but not in the satellite image; and remove a feature from the satellite image when it is determined that the feature does not exist in the stitched image but does exist in the satellite image.

In one embodiment, the system is further configured to construct a three dimensional (3D) image of the hotspot region from the sequence of consecutive ground view images, wherein to construct a three dimensional (3D) image of the hotspot region, the system is configured to: identify keypoint matches between images in the sequence of consecutive images; estimate a fundamental matrix for three-dimensional structures from the two-dimensional sequence of consecutive images coupled with local motion signals using a structure from motion (SFM) range imaging algorithm; find dense matching between the three-dimensional structures using epipolar geometry; determine dense point clouds for the three-dimensional structures using triangulation; and provide 3D dense point clouds to an autonomous vehicle (AV).

In one embodiment, the system is further configured to generate more dense point clouds from the dense point clouds using a patch-based multi view stereo (PMVS) algorithm and wherein to provide 3D dense point clouds the system is configured to provide the more dense point clouds to an autonomous vehicle (AV).

In one embodiment, the system is further configured to request additional data for use in determining if a reported anomaly resulted from a discrepancy in digital map data by establishing an extended reinforcement learning area wherein each vehicle located in the extended reinforcement learning area that is properly equipped is directed to report ground view imagery of the map anomaly hotspot to the system.

In another embodiment, a processor-implemented method for correcting high-resolution map images is provided. The method includes: receiving, by a cloud-based processor from a plurality of vehicles, ground view image data of a map anomaly hotspot captured by the vehicles, wherein the map anomaly hotspot is an area described by a high-definition map at which physical characteristics of the hotspot as observed by the vehicles are inconsistent with the description for the area provided by the high-definition map; converting the ground view image data to bird view image data using homography; removing outliers from the bird view image data; applying an error reduction algorithm for error reduction to the bird view image data with the removed outliers; stitching together a sequence of consecutive images from the bird view image data after error reduction to produce a high-definition bird view image, wherein each of the consecutive images has been generated through converting ground view image data to bird view image data using homography, removing outliers from the bird view image data, and applying an error reduction algorithm for error reduction; comparing the stitched sequence of consecutive images to a high-definition image of the hotspot to determine revisions to the high-definition image; and providing revised high-definition image data to an autonomous vehicle for use in navigating in an area near the map anomaly hotspot.

In one embodiment, converting the ground view image data to bird view image data using homography includes: calculating a perspective transform from 4 pairs of corresponding corner points; representing the prospective transform by a transform matrix M; and applying the estimated perspective transform matrix M to an image data.

In one embodiment, removing outliers from the bird view image data includes applying a RANSAC (Random Sample Consensus) algorithm or similar algorithms achieving the same objectives to remove outliers from the bird view image data.

In one embodiment, applying an error reduction algorithm includes performing image registration by matching features in the bird view image with features in the high-definition image or using direct alignment methods to search for image alignments that minimize the sum of absolute differences between overlapping pixels.

In one embodiment, applying an error reduction algorithm includes applying an iterative closest point (ICP) algorithm to iteratively revise the homography transformation used to reduce an error metric between the bird view image with outliers removed to the satellite image with outliers removed.

In one embodiment, stitching a sequence of consecutive images together includes: determining the appropriate mathematical model relating pixel coordinates in one image to pixel coordinates in another; estimating the correct alignments relating collections of images; matching distinctive features in each image to establish correspondences between images; and merging the overlapping images.

In one embodiment, the method further includes constructing a three dimensional (3D) image of the hotspot region from the sequence of consecutive images from the bird view image data after error reduction, wherein the constructing a three dimensional (3D) image of the hotspot region includes: identifying keypoint matches between images in the sequence of consecutive images; estimating a fundamental matrix for three-dimensional structures from the two-dimensional sequence of consecutive images coupled with local motion signals using a structure from motion (SFM) range imaging algorithm; finding dense matching between the three-dimensional structures using epipolar geometry; determining dense point clouds for the three-dimensional structures using triangulation; and providing 3D dense point clouds to an autonomous vehicle (AV).

In one embodiment, the method further includes generating more dense point clouds from the dense point clouds using a patch-based multi view stereo (PMVS) algorithm and wherein providing 3D dense point clouds includes providing the more dense point clouds to an autonomous vehicle (AV).

In another embodiment, a vehicle for determining digital map discrepancies is provided. The vehicle includes an insight module that includes one or more processors configured by programming instructions encoded on non-transient computer readable media. The insight module is configured to: receive, by a processor in a vehicle, pre-planned trajectory data from a navigation module in the vehicle; retrieve, by the processor, sensor data from one or more vehicle sensing systems; analyze, by the processor, the sensor data and the pre-planned trajectory data; identify, by the processor, a first map anomaly hotspot from the analysis; transmit ground view image data regarding the first map anomaly hotspot to a cloud-based server external to the vehicle; receive a request from the cloud-based server to transmit ground view image data at a second anomaly hotspot; and transmit, responsive to the request, ground view image data regarding the second map anomaly hotspot to the cloud-based server.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
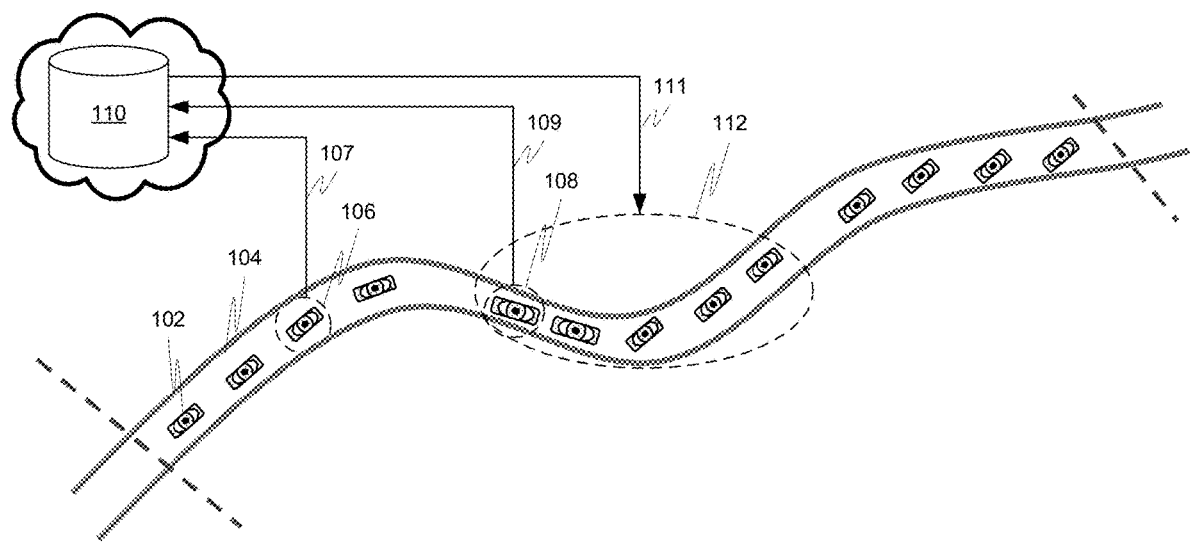
FIG. 1 is a diagram presenting a top-down view of an example scenario useful in understanding the present subject matter, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing more detailed imagery information (e.g., more detailed two-dimensional (2D) bird view imagery or three-dimensional (3D) scene reconstruction imagery) for inclusion with high-definition (HD) mapping data. The described apparatus, systems, techniques and articles can utilize crowd-sensing technology to identify a map anomaly hotspot and generate more detailed imagery information by synthesizing a number of collected sequential ground view images from a large fleet of vehicles at the map anomaly hotspot. The described apparatus, systems, techniques and articles can provide vehicle based systems for capturing ground view images and a cloud-based system for generating more detailed imagery information through synthesizing sequential ground view images collected from the vehicle based systems at a map anomaly hotspot.

The described apparatus, systems, techniques and articles can provide a method for limiting the amount of imagery uploaded to the cloud-based system wherein only imagery within a map anomaly hotspot region is uploaded to the cloud-based system. The described apparatus, systems, techniques and articles can provide an algorithm for transforming ground view imagery to bird view imagery through the synthesis of multiple ground view images and for comparing the generated bird view imagery to pre-existing high-definition imagery (e.g., satellite map) for high-definition map data updates. The described apparatus, systems, techniques and articles can provide an algorithm for fully reconstructing 3D scene scenarios, through the synthesis of multiple ground view images, to provide richer context/semantics for remote autonomous vehicle (AV) operators. The described apparatus, systems, techniques and articles can provide a methodology that can identify a map anomaly hotspot region via controller area network (CAN) bus and/or GPS information. The described apparatus, systems, techniques and articles can provide a low-cost approach for an up-to-date and improved accuracy map.

High-definition (HD) maps for autonomous driving may suffer from quality issues (e.g., geometry drift, lack of road attributes) and map update issues (e.g., may not be updated as frequently as need). Manual validation, error detection, and map corrections can be costly, inefficient, and not timely. Satellite-based road maps can be a mainstream solution for baseline HD maps, but because of an insufficient update frequency (e.g., yearly or quarterly), for example due to cost, and insufficient accuracy, for example due to aerial occlusion, quality issues may exist. A brute-force in-vehicle image crowd-sensing HD map could provide better accuracy and update frequency, but could be costly due to cellular uploading costs.

The described apparatus, systems, techniques and articles can provide a lower-cost solution for up-to-date and better accuracy map. The described apparatus, systems, techniques and articles can identify a map anomaly hotspot region, only upload imagery within the map anomaly hotspot region to a cloud-based mapping system, generate a bird view image through synthesis of a sequence of ground view images and compare the generated bird view image with an original HD map (e.g., satellite map) to update the original HD map.

FIG. 1 presents a top-down view of an example scenario useful in understanding the present subject matter in which a map discrepancy detection and correction system may be implemented. The example map discrepancy detection and correction system may, in real-time or near real-time, detect a discrepancy in HD mapping data and provide an update to the HD mapping data, for example, in the form of an updated HD image.

In the example scenario, a plurality of vehicles 102 that may use a navigational application (not shown) to obtain travel directions is depicted on a roadway 104. The navigational application may utilize various types of data such as road topology and road attributes data, road geometry data, navigation guidance data, and addressing and post office information (POI) to perform its functions. The road topology and road attributes data may include data regarding road connectivity, road type/functional road class, turn and turn restrictions, intersection, traffic sign regulators, speed limit, road properties (e.g., pavement, divided, scenic, and others), and other similar types of data. The road geometry data may include data regarding road segment geometry, road segment heading, road curvature, road slope/grade, bank angle/road tilt, and other similar types of data. The navigation guidance data may include data regarding traffic regulator sign, traffic regulator location, extended lane info, number of lanes, lane type, lane merge/lane split, lane marking, lane annotation, lane rule/guidance, natural guidance, and other similar types of data. The addressing and POIs data may include data regarding home/work address, important frequent visits, core POIs (e.g., commercial POIs), parking/toll/gas stations, and other similar types of data.

In this example, two vehicles 106, 108 are self-reporting vehicles. The self-reporting vehicles 106, 108 are configured to identify a map attribute anomaly (for example, based on CAN bus and/or GPS data) and report 107, 109 the map attribute anomaly to a map discrepancy detector 110 at a cloud-based server. The self-reporting vehicles 106, 108 may communicate with the map discrepancy detector 110, for example, via a cellular communication channel over a cellular network such as 5G, 4G LTE or 4G LTE-V2X, a public network, and a private network. The self-reporting vehicles 106, 108 include an insight application (not shown) for communicating with the map discrepancy detector 110.

An insight application in an example self-reporting vehicle 106, 108 may identify an anomaly related to map data during operation of a navigational application and communicate the anomaly to the map discrepancy detector 110. The map discrepancy detector 110 may investigate the anomaly to determine if a discrepancy in map data utilized by the navigational applications indeed exists, determine the nature of the discrepancy, and propose a correction to the map data. The example map discrepancy detector 110 is configured to receive image data from the insight application in the anomaly reporting vehicles 106, 108, may direct the insight application to provide additional sensor data, and may direct other vehicles in the vicinity of a reported anomaly (a map anomaly hotspot) to provide image data that may be used to further evaluate the anomaly.

When the example map discrepancy detector 110 receives a sufficient number of reports from the same region, the map discrepancy detector 110 is configured to issue a scrutiny advisory to incoming vehicles. The example map discrepancy detector 110 is configured to proactively request additional data for use in determining if an anomaly indeed resulted from a map data discrepancy at a map anomaly hotspot area. In the example scenario, the map discrepancy detector 110 may have received one or more anomaly messages from vehicles reporting a similar anomaly at a specific location—a map anomaly hotspot area. To investigate the anomaly further, the example map discrepancy detector 110 may establish an extended reinforcement learning area 112. The example map discrepancy detector 110 is configured to request 111 each vehicle in the extended reinforcement learning area 112 that is equipped with an event insight module to report 109 detailed sensor data (e.g., GPS, CAN, image, radar, lidar information), which includes ground view image data, to the map discrepancy detector 110 for use in determining if a map discrepancy actually exists at the map anomaly hotspot area. In this example, at least one vehicle 108 in the extended reinforcement learning area 112 is equipped with an event insight module to report 109 more detailed sensor data to the map discrepancy detector 110.

The example map discrepancy detector 110 is further configured to convert a sequence of ground view imagery to bird view imagery through the synthesis of multiple ground view images and configured to compare the generated bird view imagery to pre-existing HD imagery (e.g., satellite map) to identify a correction to the pre-existing HD imagery for high-definition map data updates. The example map discrepancy detector 110 is further configured to reconstruct 3D scene scenarios at the anomaly hotspot through the synthesis of sequential ground view images.

Figure 2:
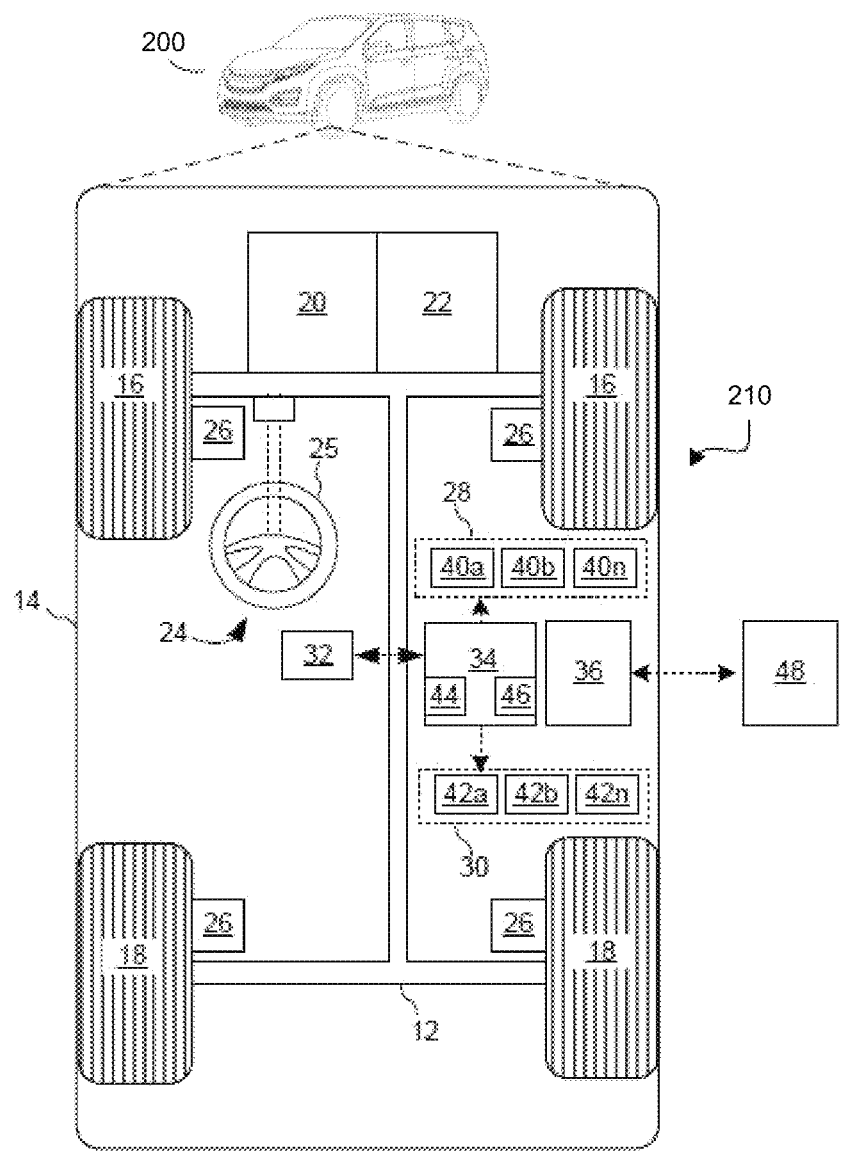
FIG. 2 is a block diagram of an example vehicle that may employ both a navigational module and an insight module, in accordance with various embodiments.

FIG. 2 is a block diagram of an example vehicle 200 that may employ both a navigational module and an insight module 210. The example vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14.

The example vehicle 200 may be an autonomous vehicle (e.g., a vehicle that is automatically controlled to carry passengers from one location to another), a semi-autonomous vehicle or a passenger-driven vehicle. In any case, an insight application 210 is incorporated into the example vehicle 200. The example vehicle 200 is depicted as a passenger car but may also be another vehicle type such as a motorcycle, truck, sport utility vehicle (SUV), recreational vehicles (RV), marine vessel, aircraft, etc.

The example vehicle 200 includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 200 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 200 may also include interior and/or exterior vehicle features not illustrated in FIG. 2, such as various doors, a trunk, and cabin features such as air, music, lighting, touch-screen display components (such as those used in connection with navigation systems), and the like.

The data storage device 32 stores data for use in the vehicle 200. In various embodiments, the data storage device 32 stores defined maps of the navigable environment. In various embodiments, the defined maps may be predefined by and obtained from a remote system. For example, the defined maps may be assembled by the remote system and communicated to the vehicle 200 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 200. In various embodiments, controller 34 is configured to implement an insight module as discussed in detail below.

The controller 34 may implement a navigational module and an insight module 210. That is, suitable software and/or hardware components of controller 34 (e.g., processor 44 and computer-readable storage device 46) are utilized to provide a navigational module and an insight module that is used in conjunction with vehicle 200.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for controlling the components of the vehicle 200, and generate control signals that are transmitted to the actuator system 30 to automatically control the components of the vehicle 200 based on the logic, calculations, methods, and/or algorithms. Although only one controller 34 is shown in FIG. 2, embodiments of the vehicle 200 may include any number of controllers 34 that communicate over a suitable communication medium or a combination of communication mediums and that cooperate to process the sensor signals, perform logic, calculations, methods, and/or algorithms, and generate control signals to automatically control features of the vehicle 200.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle 200 may also include a perception system and a positioning system. The perception system synthesizes and processes the acquired sensor data and predicts the presence, location, classification, and/or path of objects and features of the environment of the vehicle 200. In various embodiments, the perception system can incorporate information from multiple sensors (e.g., sensor system 28), including but not limited to cameras, lidars, radars, and/or any number of other types of sensors.

The positioning system processes sensor data along with other data to determine a position (e.g., a local position relative to a map, an exact position relative to a lane of a road, a vehicle heading, etc.) of the vehicle 200 relative to the environment. As can be appreciated, a variety of techniques may be employed to accomplish this localization, including, for example, simultaneous localization and mapping (SLAM), particle filters, Kalman filters, Bayesian filters, and the like.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3:
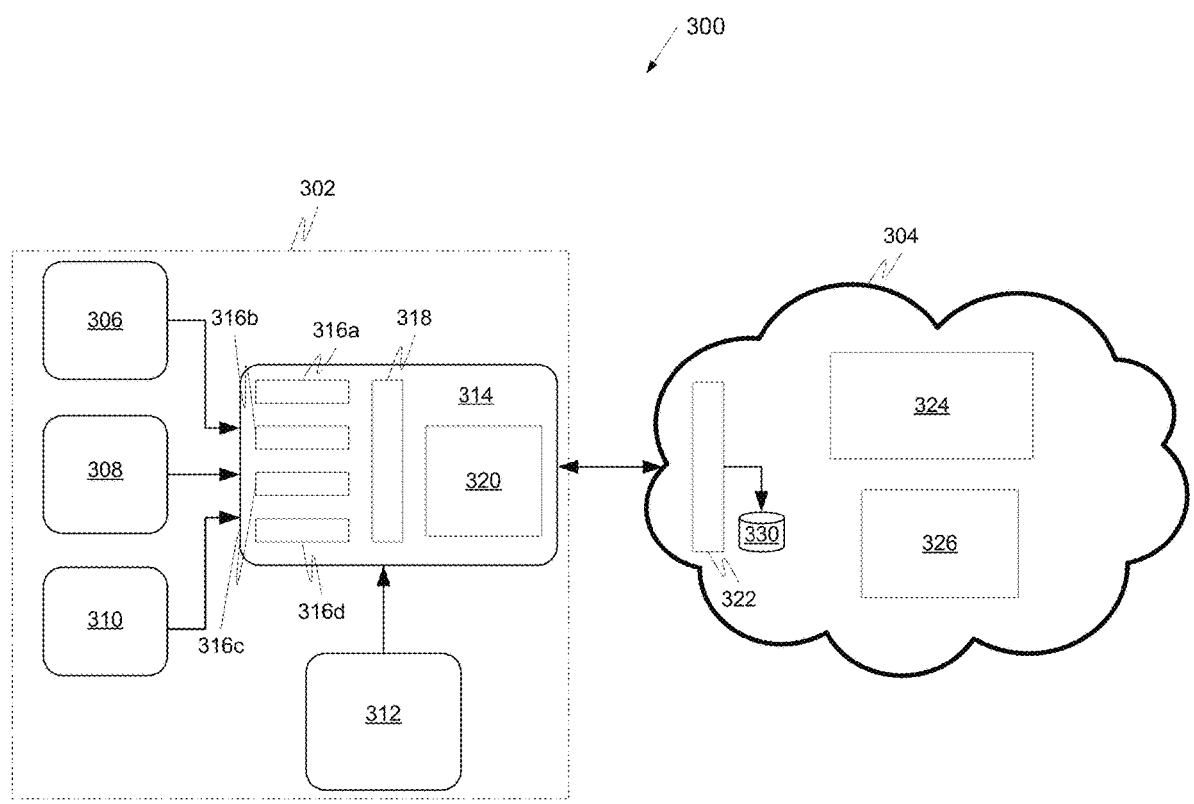
FIG. 3 is a block diagram depicting example components of an example map discrepancy detection and correction system, in accordance with various embodiments.

FIG. 3 is a block diagram depicting example components of an example map discrepancy detection and correction system 300. The example system includes one or more vehicles 302 and a computer-implemented map discrepancy detector 304.

An example vehicle 302 includes a position determination module 306, which may utilize a GPS sensor, and a controller area network (CAN) 308 over which various vehicle controllers may communicate messages containing, for example, vehicle performance data, such as velocity, acceleration, and yaw. The example vehicle 302 may also include a variety of perception sensors 310 such as a lidar, radar, and camera. The example vehicle 302 includes a navigational module 312 and an event insight module 314 that is configured to identify an anomaly related to map data during operation of the navigational module 312 and communicate the anomaly to the map discrepancy detector 304.

The example event insight module 314 is configured to retrieve pre-planned trajectory data from the navigation module 312 and sensor data (e.g., 316a, 316b, 316c, 316d) from one or more vehicle sensing systems. In this example, the sensor data comprises vehicle performance data, vehicle perception data, and vehicle position data. The example vehicle perception data is retrieved from perception sensors (e.g., radar, lidar, camera), the example vehicle position data is retrieved from the position determination module 306 as GPS data 316a, and the example vehicle performance data is retrieved from messages on the CAN 308. The example vehicle performance data comprises vehicle velocity data 316b, vehicle acceleration data 316c, and vehicle yaw data 316d.

The example event insight module 314 is configured to analyze the sensor data and the pre-planned trajectory data and identify an anomaly with respect to map data from the analysis. The example event insight module 314 may be configured to identify an anomaly from unnatural driving behaviors, from disobeyed navigation maneuver instructions, contradictions between map and sensor data, and others. The example event insight module 314 may be configured to perform a number of different analysis and identification operations to identify an anomaly.

In one example, the event insight module 314 is configured to analyze the vehicle sensing data and the pre-planned trajectory data by comparing actual vehicle behavior as determined by the vehicle sensing data to expected vehicle behavior based on the pre-planned trajectory data. In this example, the event insight module 314 may be further configured to identify an anomaly from the analysis by identifying a discrepancy between actual vehicle behavior as determined by the vehicle sensing data and expected vehicle behavior based on the path planning data.

In another example, the event insight module 314 is configured to analyze the vehicle sensing data and the pre-planned trajectory data by determining actual vehicle trajectory data from the sensor data and comparing the actual trajectory data with the pre-planned trajectory data. In this example, the event insight module 314 may be further configured to identify an anomaly from the analysis by identifying an unnatural driving behavior such as a sudden lane change, a sudden road exit, or driving in the opposite direction on a map pathway.

In another example, the event insight module 314 is configured to analyze the vehicle sensing data and the pre-planned trajectory data by comparing, in the navigation module, the actual vehicle travel with the pre-planned trajectory. In this example, the event insight module 314 is further configured to identify an anomaly from the analysis by receiving a notification from the navigation module that the vehicle deviated from a navigation maneuver instruction provided by the navigation module.

In another example, the event insight module 314 is configured to analyze the vehicle sensing data and the pre-planned trajectory data by comparing map data that identifies a structural feature on the pre-planned vehicle path with perception data (e.g., lidar and/or camera data) for an actual area at which the structural feature is expected to exist. In this example, the event insight module 314 may be further configured to identify an anomaly from the analysis by identifying a disagreement between the map data and the perception data regarding the existence of the structural feature. As an example, a guard rail may not be detected by perception sensors while the map data indicates that a guard rail should be present. The example event insight map may detect the inconsistency between the map data and the vehicle experience and identify the inconsistency as an anomaly.

The example event insight module 314 includes a data filtering module 318 that may be used by the event insight module 314 to analyze the sensor data and the pre-planned trajectory data to identify an anomaly with respect to map data from the analysis. In one example use of the data filtering module 318, the example event insight module 314 is configured to analyze the vehicle sensing data and the pre-planned trajectory data by applying the data filtering module 318 with a tolerance threshold for classifying changes in the sensor data. Identifying an anomaly from the analysis, in this example, includes identifying a sudden change in the sensor data that exceeds the tolerance threshold.

In another example use of the data filtering module 318, the example event insight module 314 is configured to analyze the vehicle sensing data and the pre-planned trajectory data by applying the data filtering module 318 as a correlation function for the sensor data. Identifying an anomaly from the analysis, in this example, includes identifying an instance when the correlation between the sensor data deviates beyond a predetermined level.

The example event insight module 314 further includes a map anomaly synthesis module 320 that is configured to generate an anomaly message containing the sensor data (including ground view imagery at the map anomaly hotspot) and the pre-planned trajectory data related to an identified anomaly and send the anomaly message to a central repository associated with the map discrepancy detector 304.

Through the use of the example event insight module 314, the example vehicle 302 is configured to receive, by a processor in a vehicle, pre-planned trajectory data from a navigation module 312 in the vehicle; retrieve, by the processor, sensor data (e.g., 316a, 316b, 316c, and/or 316d) from one or more vehicle sensing systems (e.g., 306, 308, and/or 310); analyze, by the processor, the sensor data and the pre-planned trajectory data; identify, by the processor, an anomaly from the analysis (e.g., via map anomaly synthesis module 320); and transmit image data regarding the anomaly to a cloud-based server 304 external to the vehicle; wherein the cloud-based server 304 is configured to analyze the information regarding the anomaly to determine if a navigation map attribute is incorrect. Through the use of the example event insight module 314, the example vehicle 302 is configured to identify a map anomaly hotspot by identifying a contradiction between map and sensor data, from human intervention during autonomous driving, a disobeyed navigation instruction, by sensing unnatural driving behavior, or other ways.

The example map discrepancy detector 304 is a computer-implemented component that is implemented, for example by a cloud-based server, at a location external to any of the vehicles that contain an event insight module 314. The example map discrepancy detector 304 may include an event ingestion module 322 configured to store anomaly information from event insight modules in a central repository 330, a map discrepancy determination module 324 configured to determine if a reported anomaly resulted from a discrepancy in digital map data, and an image revision module 326 configured to analyze image data from the vehicles 302 to determine if high-definition map images need updating.

The example map discrepancy detector 304 may be configured to analyze certain anomaly information only after a significant number of entities report similar anomalies in the same geographic area. This may allow the map discrepancy detector 304 to filter out anomalies that have nothing to do with map discrepancies. As an example, this may allow the map discrepancy detector 304 to filter out reported anomalies that are due to driver behavior not associated with a map discrepancy (e.g., a specific driver may not like to follow navigational instructions and a reported anomaly based on a deviation from navigational instructions can be rejected since other entities are not reporting a similar anomaly).

Figure 4:
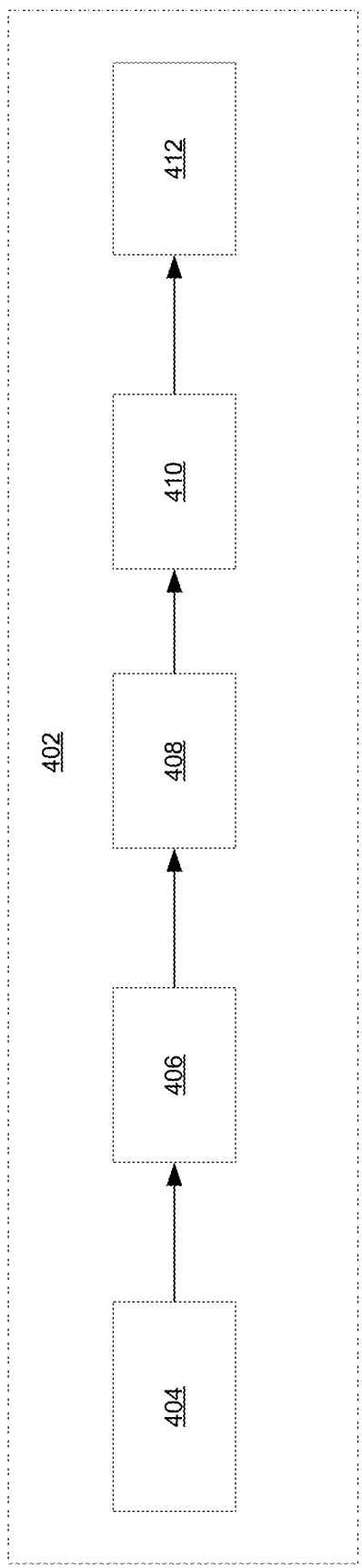
FIG. 4 is a block diagram depicting an example image revision module, in accordance with various embodiments.

FIG. 4 is a block diagram depicting an example image revision module 402. The example image revision module 402 is configured to convert a sequence of ground view images at a map anomaly hotspot to a bird view (i.e., top down view) image, compare the bird view image to a high-definition image (e.g., satellite image) associated with autonomous vehicle mapping data, and adjust the high-definition image if the bird view image indicates a need for adjustment. The example image revision module 402 includes a bird-view conversion module 404, an outlier removal module 406, an error reduction module 408, an image stitching module 410, and an image comparator/updating module 412. The example image revision module 402 comprises one or more processors configured by programming instructions on computer readable media to implement the bird-view conversion module 404, outlier removal module 406, error reduction module 408, image stitching module 410, and image comparator/updating module 412. Operations of the bird-view conversion module 404, outlier removal module 406, error reduction module 408, image stitching module 410, and image comparator/updating module 412 will be described with reference to FIG. 5.

Figure 5:
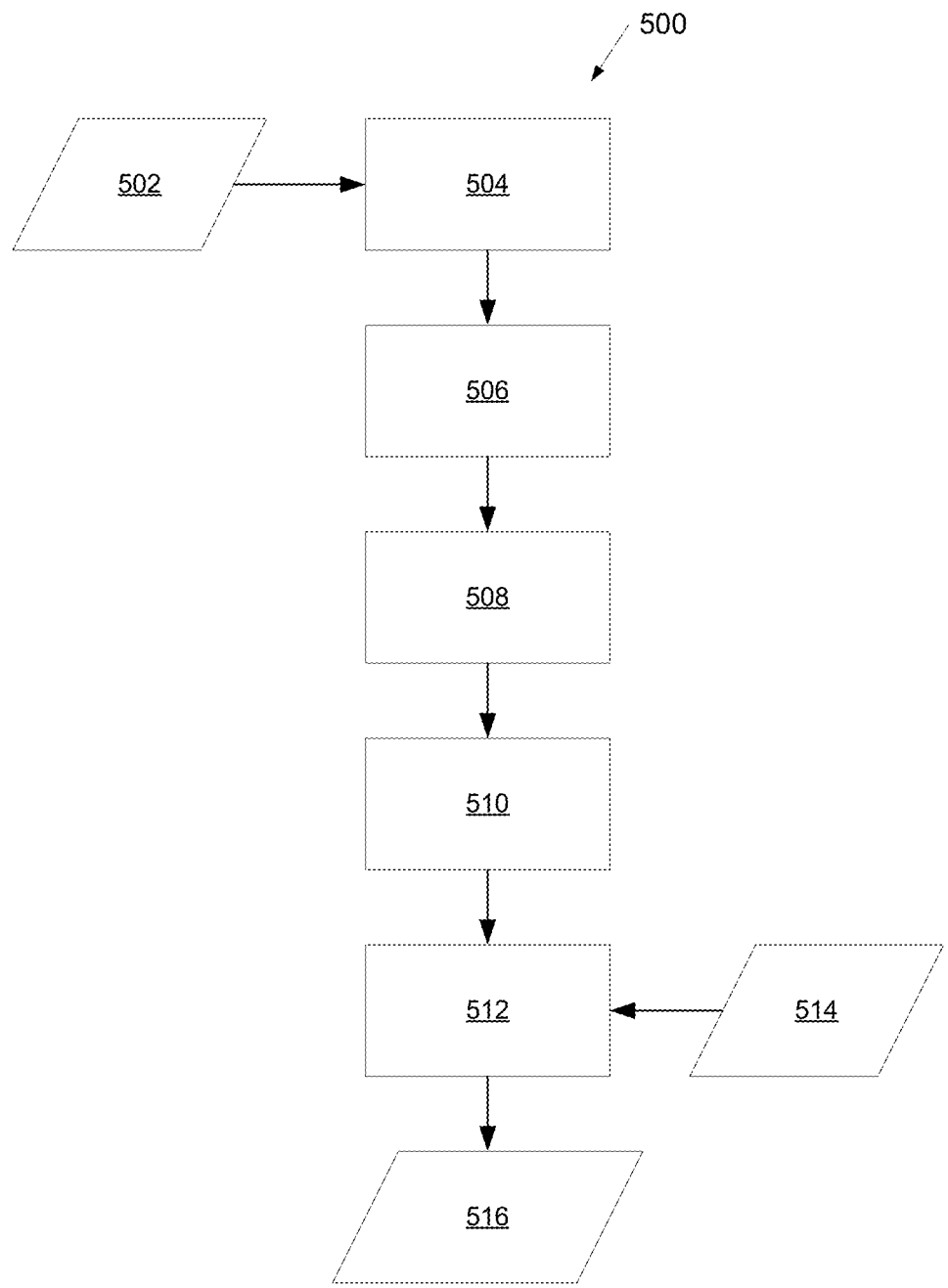
FIG. 5 is a process flow chart depicting an example process in an example image revision module, in accordance with various embodiments.

FIG. 5 is a process flow chart depicting an example process 500 in an example image revision module 402 for converting a sequence of ground view images at a map anomaly hotspot to a bird view image, comparing the bird view image to a high-definition image associated with autonomous vehicle mapping data, and adjusting the high-definition image if the bird view image indicates a need for adjustment.

The example process 500 includes converting a sequence of ground view images 502 to bird view imagery (operation 504). The example bird-view conversion module 404 is configured to perform bird-view conversion (operation 504). In particular, the example bird-view conversion module 404 is configured to receive, from a plurality of vehicles, ground view image data 502 of a map anomaly hotspot captured by the vehicles, wherein the map anomaly hotspot is an area described by a high-definition map (e.g., satellite map) in which physical characteristics of the hotspot as observed by the vehicles are inconsistent with the description for the area provided by the high-definition map. Receiving ground view image data may include receiving a report of a map anomaly hotspot from a vehicle including ground view image data at the map anomaly hotspot, instructing a plurality of vehicles in an area near the map anomaly hotspot to upload ground view image data at the map anomaly hotspot, and receiving ground view image data of the map anomaly hotspot captured by the plurality of vehicles.

The example bird-view conversion module 404 is configured to convert the ground view image data to bird view image data using homography. Converting the ground view image data to bird view image data using homography may include calculating a perspective transform from 4 pairs of corresponding corner points, representing the prospective transform by a 3 by 3 transform matrix M; and applying the estimated perspective transform matrix M to the ground view image data.

The example process 500 includes removing outliers from the bird view image data (operation 506). The example outlier removal module 406 is configured to remove outliers from the bird view image data. The example outlier removal module 406 is configured to remove outliers from the bird view image data by applying a RANSAC (Random Sample Consensus) algorithm. The example RANSAC algorithm applies an iterative process for robust parameter estimation to fit mathematical models from sets of observed data points which may contain outliers. The example algorithm is non-deterministic in the sense that it produces a reasonable result only with a certain probability, with this probability increasing as more iterations are performed. The example RANSAC algorithm attempts to fit several models using some of the point pairs and then check if the models were able to relate most of the points. The best model—the homography, which produces the highest number of correct matches—is then chosen by the example RANSAC algorithm as the answer for the problem. The example outlier removal module 406 is configured to apply a RANSAC algorithm to remove outliers from the bird view image data by applying the RANSAC algorithm to feature descriptors of the bird view image and feature descriptors of the high-definition image to which the bird view image is to be compared.

The example process 500 includes error reduction after outlier removal (operation 508). The example error reduction module 508 is configured to perform error reduction. The example error reduction module 408 is configured to apply an error reduction algorithm, such as an iterative closest point (ICP) algorithm, to the bird view image data with the removed outliers to reduce error in the bird view image data. The example error reduction module 408 is configured to apply an iterative closest point (ICP) algorithm for error reduction by performing image registration by matching features in a set of images (e.g., matching features between a bird view image and a high-definition image) or using direct alignment methods to search for image alignments that minimize the sum of absolute differences between overlapping pixels. Feature matching may involve applying the ICP algorithm to iteratively revise the homography transformation needed to minimize an error metric between the bird view image with outliers removed (e.g., using RANSAC) to the satellite image with outliers removed (e.g., using RANSAC).

The example process 500 includes image stitching (operation 510). The example image stitching module 410 is configured to perform image stitching operation 510. The example image stitching module 410 is configured to stitch together (e.g., combine multiple photographic images with overlapping fields of view to produce a segmented panorama or high-resolution image) a sequence of consecutive images from the bird view image data after error reduction to produce a high-resolution image. Each of the consecutive images used in the stitching operation was generated through converting ground view image data to bird view image data using homography, applying a RANSAC algorithm to remove outliers from the bird view image data, and applying an ICP algorithm for error reduction. The example image stitching module 410 is configured to stitch a sequence of consecutive images together by determining the appropriate mathematical model relating pixel coordinates in one image to pixel coordinates in another; estimating the correct alignments relating collections of images; matching distinctive features in each image to establish correspondences between images; and merging the overlapping images.

Listed below is an example mathematical model that can be used for stitching operations. In this example, there are two sets of equations:

(A) Motion Equations:

$$K_{t-1} \circ A_t = K_t \quad (1)$$

$$L_{t-1} \circ B_t = L_t \quad (2)$$

(B) Warping (Projection) Equations:

$$K_{t-1} * M = L_{t-1} \quad (3)$$

$$K_t * M = L_t \quad (4)$$

Incorporating equation 3 and equation 4 into equation 2, yields:

$$K_{t-1} * M \circ B_t = K_t * M$$

$$\because K_{t-1} \circ A_t = K_t$$

$$\therefore K_{t-1} * M \circ B_t = K_{t-1} \circ A_t * M$$

If $\circ$ is *:
Then: $M * B_t = A_t * M$
Thus: $B_t = M^{-1} * A_t * M$
Given M is derived and $A_t$ is measured from experiments, $B_t$ can be derived $B_t$ is used to overlay/stitch a sequence of consecutive image together when it is compared with a high-definition (e.g., final satellite image)

The example process 500 includes comparing the stitched bird view image to a high-definition image 514 and revising the high-definition image if necessary (operation 512) to generate a revised high-definition image 516. The example image comparator/updating module 412 is configured to perform the comparing and updating operations. The example image comparator/updating module 412 is configured to compare the stitched sequence of consecutive images to a high-definition image 514 at the hotspot to determine revisions to the high-definition image 514. The example image comparator/updating module 412 is configured to add a feature from the stitched image to the high-definition image 514 when it is determined that the feature exists in the stitched image but not in the satellite image. The example image comparator/updating module 412 is configured to remove a feature from the satellite image when it is determined that the feature does not exist in the stitched image but does exist in the satellite image.

The example image revision module 402 is further configured to provide the revised high-definition image data to an autonomous vehicle for use in navigating in an area near the map anomaly hotspot.

Figure 6A:
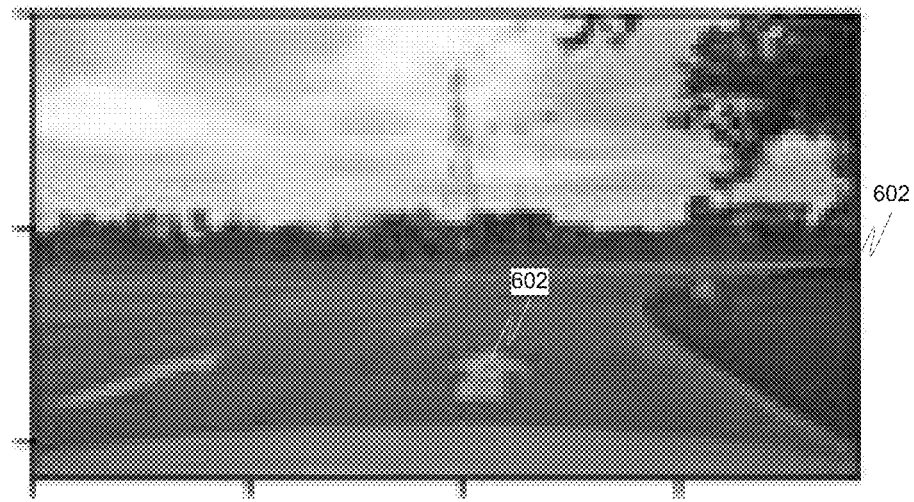
FIGS. 6A, 6B and 6C are diagrams illustrate an example technique for converting ground view image data to bird view image data using homography, in accordance with various embodiments.
Figure 6B:
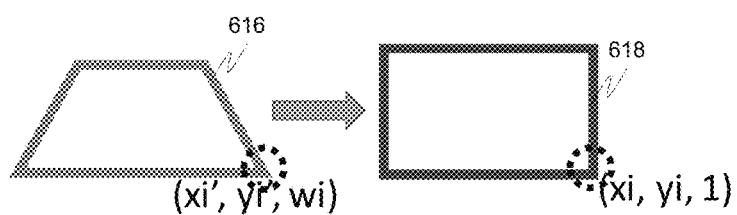
Figure 6C:
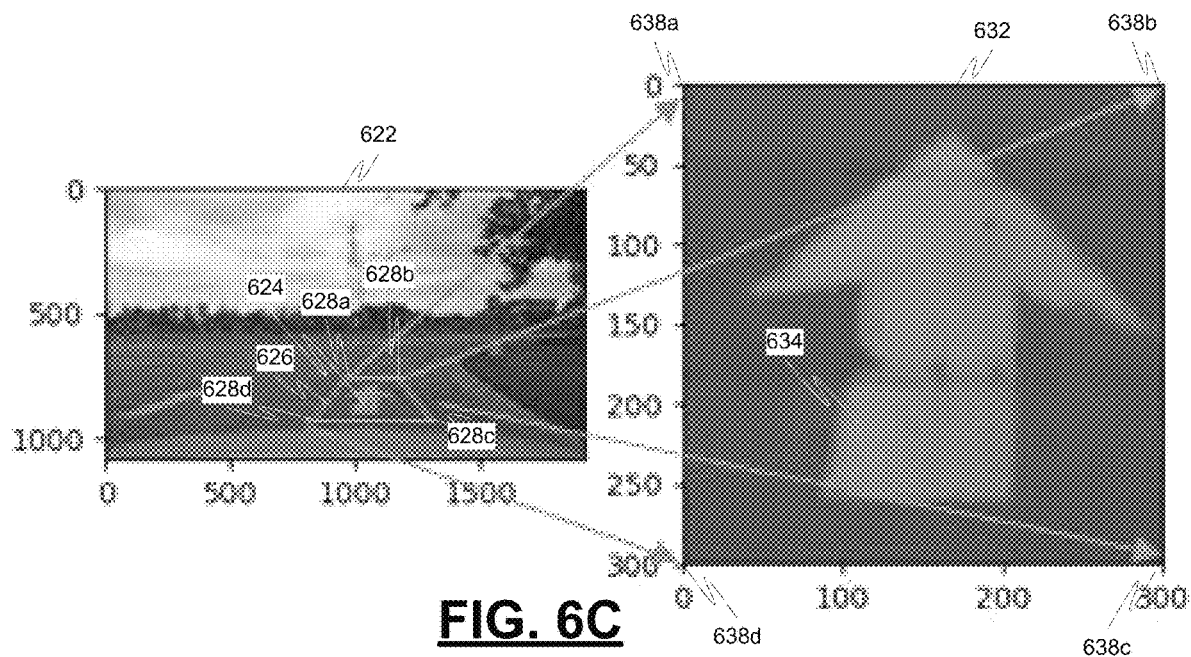

FIGS. 6A, 6B and 6C illustrate an example technique for converting ground view image data to bird view image data using homography. FIG. 6A is a diagram depicting an example ground view image 602 of an arrow symbol 604. FIG. 6B is a diagram depicting an example trapezoidal shape 612 that is be transformed to a rectangular shape 614 and used for warping the arrow symbol 604 when converting from a ground view image of the arrow symbol to a bird view image of the arrow symbol. FIG. 6C is a diagram illustrating the conversion of an arrow shape 624 in a ground view diagram 622 to an arrow shape 634 in a bird view diagram 632 by warping.

As illustrated in FIG. 6B, an example bird-view conversion module (e.g., bird-view conversion module 404) is configured to calculates a perspective transform from 4 pairs of corresponding corner points
where i=1,2,3,4

$$\begin{bmatrix} x_i \\ y_i \\ 1 \end{bmatrix} \rightarrow \begin{bmatrix} x'_i \\ y'_i \\ w_i \end{bmatrix}$$

The perspective transform is represented by a 3×3 matrix M:

$$\begin{bmatrix} x'_i \\ y'_i \\ w_i \end{bmatrix} = \begin{bmatrix} M_{11} & M_{12} & M_{13} \\ M_{21} & M_{22} & M_{23} \\ M_{31} & M_{32} & M_{33} \end{bmatrix} \times \begin{bmatrix} x_i \\ y_i \\ 1 \end{bmatrix}$$

↳ Homography

Matrix M could be calculated

Thus, in each image to be warped, the estimated perspective transform matrix M is applied to the image, and the original pixel (x, y) is projected to (X_dst, Y_dst):

Bird View (Warped) Image $$\begin{bmatrix} x_{dst} \\ y_{dst} \end{bmatrix} = \begin{bmatrix} \frac{M_{11}x + M_{12}y + M_{13}}{M_{31}x + M_{32}y + M_{33}} \\ \frac{M_{21}x + M_{22}y + M_{23}}{M_{31}x + M_{32}y + M_{33}} \end{bmatrix}$$

Original Ground View Image

FIG. 6C illustrates the trapezoidal area 626 used to identify the pixels around the arrow symbol 624 in the ground view image 622 to be warped to generate the bird-view image 632 of the arrow symbol 634. The four corners (628a, 628b, 628c, and 628d) of the trapezoidal area 626 are translated, respectively, to the four corners (638a, 6368, 638c, and 638d) in the warped bird-view image.

Figure 7:
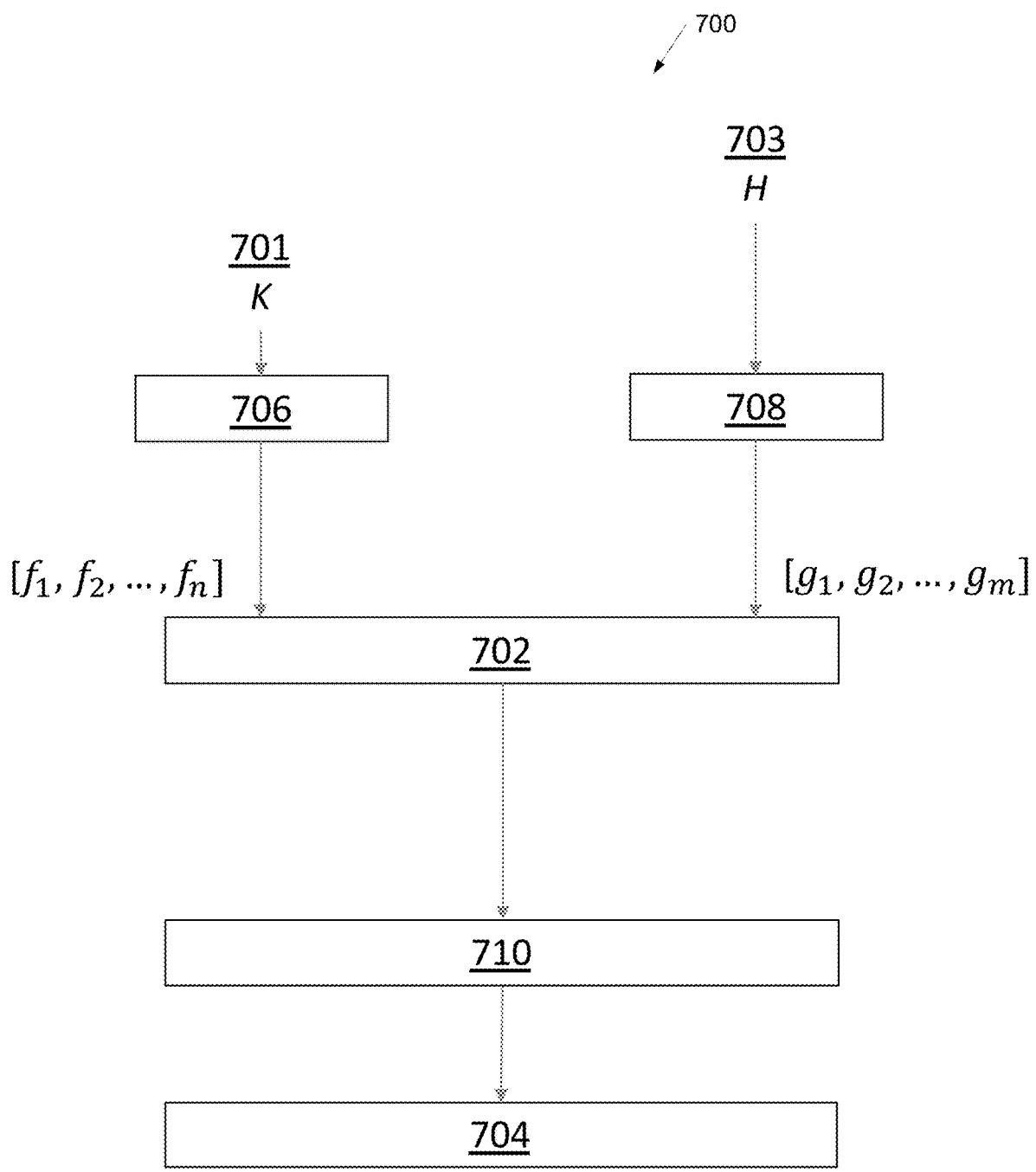
FIG. 7 is a flow diagram in an example system that uses a RANSAC outlier detector and eliminator module for outlier removal and an ICP module for error detection, in accordance with various embodiments.

FIG. 7 is a flow diagram in an example system 700 that uses a RANSAC outlier detector and eliminator module 702 for outlier removal and an ICP module 704 for error detection. In the example system 700, features of a bird view image 701 are identified via a feature descriptor module 706, and features of a high-definition image 703 (e.g., satellite image) are identified via a feature descriptor module 708. The identified features $[f_1, f_2, \ldots, f_n]$ of the bird view image 701 and the identified features $[g_1, g_2, \ldots, g_n]$ of the high-definition image 703 are input to the RANSAC module

702. Different feature extraction methods including SIFT/SURF/ORB/FAST, etc. could be used to generate features of the bird view image 701 and high-definition image 703.

The example RANSAC module 702 is configured to randomly select a minimal subset of points; hypothesize a model; compute an error function; select points consistent with model; and repeat the hypothesize-and-verify loop. This is performed to remove outliers from the bird view image.

The example system 700 includes feature matching 710 wherein features from the bird view image with outliers removed are matched to features of the high-definition image. After feature matching, imaging registration between the bird view image and the high-definition takes place via the performance of the ICP module 704 of an ICP process.

ICP can be formulated as minimization problem where ($\varsigma(t)$ is scaling/rotation factor):

$$\varsigma(t) = \underset{\varsigma(t)}{\arg\min} \|f_i(t) - G(g_i(t), \varsigma(t))\|$$

Figure 8A:
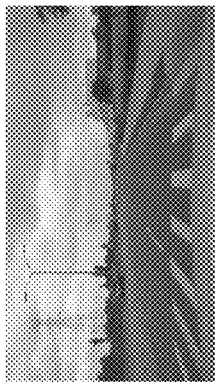
FIGS. 8A, 8B, and 8C are diagrams illustrating the example conversion of a sequence of ground view images to a stitched bird view image, in accordance with various embodiments.
Figure 8A:
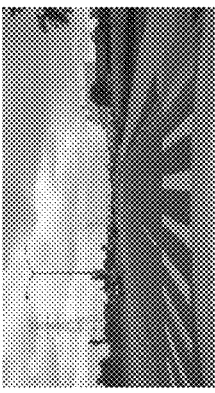
Figure 8A:
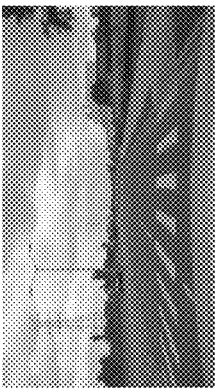
Figure 8A:
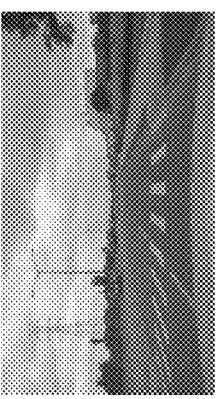
Figure 8B:
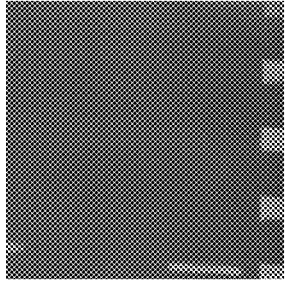
Figure 8B:
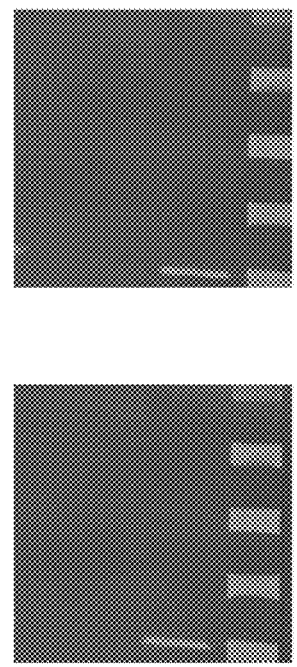
Figure 8B:
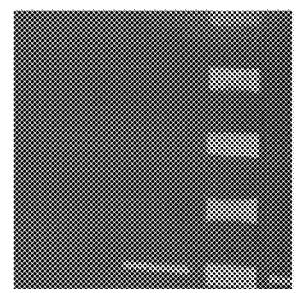
Figure 8C:
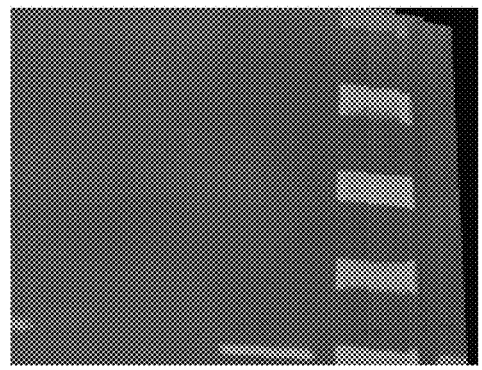

FIGS. 8A, 8B, and 8C are diagrams illustrating the example conversion of a sequence of ground view images to a stitched bird view image. FIG. 8A depicts a sequence of four ground view images. FIG. 8B depicts a sequence of bird view images, wherein each bird view image corresponds to one of the ground view images. FIG. 8C depicts an example Bird view image after the stitching of sequential bird view images.

Figure 9:
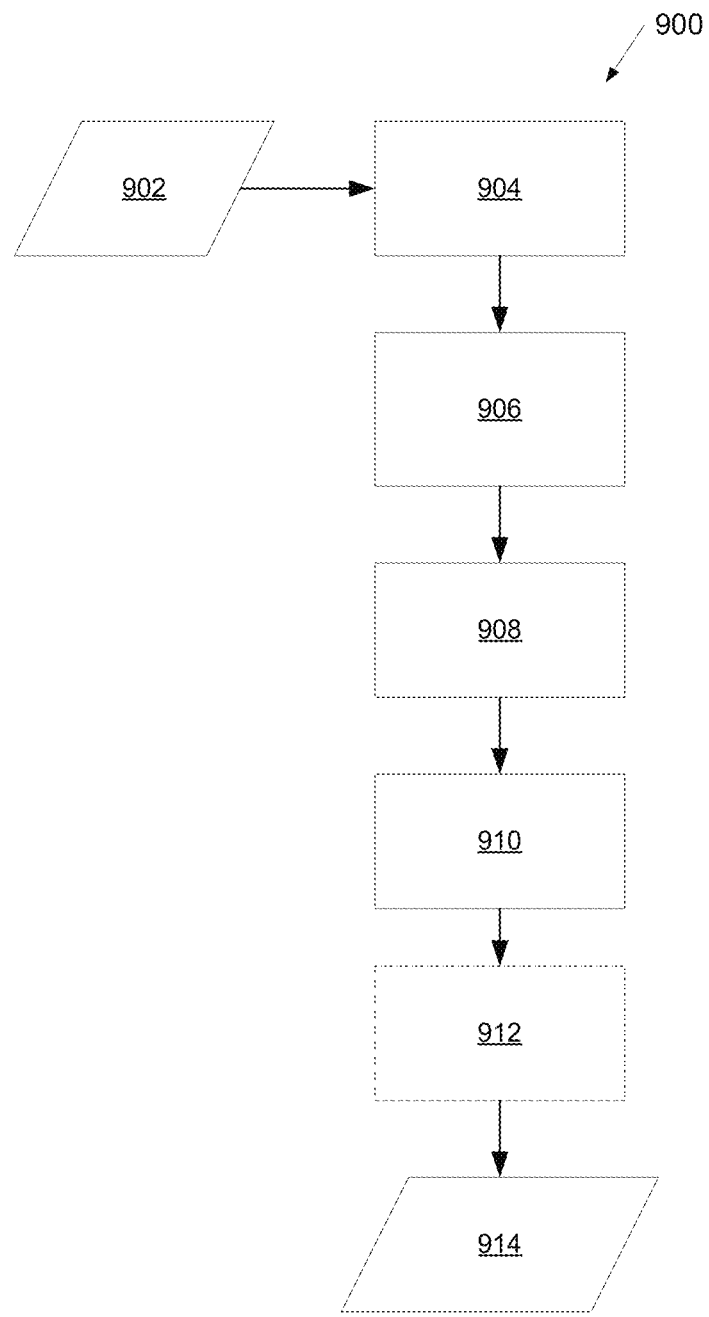
FIG. 9 is a process flow chart depicting an example process for generating a 3D image from a sequence of images, in accordance with various embodiments.

FIG. 9 is a process flow chart depicting an example process 900 for generating a 3D image from a sequence of images. The example image revision model 502 may be configured to construct a three dimensional (3D) image of a hotspot region from a sequence of consecutive ground view images. The example process 900 includes identifying keypoint matches between a sequence of ground view images 902 (operation 904). The example process 900 includes estimating a fundamental matrix for three-dimensional structures from the two-dimensional sequence of consecutive images coupled with local motion signals using a structure from motion (SFM) range imaging algorithm (operation 906). The example process 900 includes finding dense matching between the three-dimensional structures using epipolar geometry (operation 908). The example process 900 includes determining dense point clouds (point cloud is a set of data points in space) for the three-dimensional structures using triangulation (triangulation is the process of determining the location of a point by forming triangles to it from known points) (operation 910). The 3D dense point clouds 914 may be provided to an autonomous vehicle (AV) for richer context/semantics for remote AV operation. The example process 900 may optionally include constructing more dense point clouds from the dense point clouds using a patch-based multi view stereo (PMVS) algorithm (operation 912) and providing the more dense point clouds to an autonomous vehicle (AV) instead of the dense point cloud.

The example process 900 may use RANSAC to estimate the fundamental matrix. Discussed below is an example process for using RANSAC to estimate the fundamental matrix:

For many times:
1. Pick 8 points (In this example, Fundamental matrix is a 3×3 matrix of rank 2 since scale is indifferent here, thus 8 pairs of point correspondences are sufficient to estimate the fundamental matrix F.)
2. Compute a solution for F using these 8 points with the help of SVD (singular value decomposition)
3. Count number of inliers that with $x_1^T F x_2 \neg 0$ close to 0
4. Pick the one with the largest number of inliers While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for correcting high-definition map images, the system comprising one or more processors configured by programming instructions encoded on non-transitory computer readable media, the system configured to:
receive, by a cloud-based processor from a plurality of vehicles, ground view image data of a map anomaly hotspot captured by the vehicles, wherein the map anomaly hotspot is an area described by a high-definition bird view map at which physical characteristics of the map anomaly hotspot as observed by the vehicles are inconsistent with a description for the area provided by the high-definition bird view map;
convert the ground view image data to bird view image data using homography;
remove outliers from the bird view image data;
apply an error reduction algorithm for error reduction to the bird view image data with the removed outliers;
stitch together a sequence of consecutive images from the bird view image data after error reduction to produce a high-definition image, wherein each of the consecutive images has been generated through converting the ground view image data to the bird view image data using homography, removing outliers from the bird view image data, and applying an error reduction algorithm for error reduction;
compare the stitched sequence of consecutive images to a pre-existing high-definition image of the map anomaly hotspot to determine revisions to the pre-existing high-definition image; and
provide revised high-definition image data to an autonomous vehicle for use in navigating in an area near the map anomaly hotspot.

2. The system of claim 1, further configured to:
receive a report, from a vehicle, of a map anomaly hotspot that includes ground view image data at the map anomaly hotspot;
instruct a plurality of vehicles in an area near the map anomaly hotspot to upload ground view image data at the map anomaly hotspot; and
receive the ground view image data of the map anomaly hotspot captured by the plurality of vehicles.

3. The system of claim 1, wherein to convert the ground view image data to bird view image data using homography, the system is configured to:
calculate a perspective transform from 4 pairs of corresponding corner points;
represent the perspective transform by a transform matrix M; and apply the transform matrix M to the ground view image data.

4. The system of claim 1, wherein to remove outliers from the bird view image data the system is configured to apply a RANSAC (Random Sample Consensus) algorithm to remove outliers from the bird view image data.

5. The system of claim 1, wherein to apply an error reduction algorithm, the system is configured to perform image registration by matching features in the bird view image with features in the pre-existing high-definition image or using direct alignment methods to search for image alignments that minimize the sum of absolute differences between overlapping pixels.

6. The system of claim 5, wherein to apply an error reduction algorithm, the system is configured to apply an iterative closest point (ICP) algorithm to iteratively revise a homography transformation used to reduce an error metric between the bird view image with outliers removed to the pre-existing high-definition image with outliers removed.

7. The system of claim 1, wherein to stitch together a sequence of consecutive images from the bird view image data, the system is configured to:
   determine an appropriate mathematical model relating pixel coordinates in one image to pixel coordinates in another;
   estimate correct alignments relating collections of images;
   match distinctive features in each image to establish correspondences between images; and
   merge overlapping images.

8. The system of claim 1, wherein to compare the stitched sequence of consecutive images to a pre-existing high-definition image of the map anomaly hotspot to determine revisions to the pre-existing high-definition image, the system is configured to:
   add a feature from the stitched sequence of consecutive images to the pre-existing high-definition image when it is determined that the feature exists in the stitched sequence of consecutive images but not in the pre-existing high-definition image; and
   remove a feature from the pre-existing high-definition image when it is determined that the feature does not exist in the stitched sequence of consecutive images but does exist in the pre-existing high-definition image.

9. The system of claim 1, further configured to construct a three dimensional (3D) image of the map anomaly hotspot from the stitched sequence of consecutive images, wherein to construct a three dimensional (3D) image of the map anomaly hotspot, the system is configured to:
   identify keypoint matches between images in the stitched sequence of consecutive images;
   estimate a fundamental matrix for three-dimensional structures from the stitched sequence of consecutive images coupled with local motion signals using a structure from motion (SFM) range imaging algorithm;
   find dense matching between the three-dimensional structures using epipolar geometry;
   determine dense point clouds for the three-dimensional structures using triangulation; and
   provide 3D dense point clouds to the AV or a different AV.

10. The system of claim 9, further configured to generate more dense point clouds from the dense point clouds using a patch-based multi view stereo (PMVS) algorithm and wherein to provide 3D dense point clouds the system is configured to provide the more dense point clouds to the AV or the different AV.

11. The system of claim 1, further configured to request additional data for use in determining if a reported anomaly resulted from a discrepancy in digital map data by establishing an extended reinforcement learning area wherein each vehicle located in the extended reinforcement learning area that is properly equipped is directed to report ground view imagery of the map anomaly hotspot to the system.

12. A processor-implemented method for correcting high-resolution map images, the method comprising:
   receiving, by a cloud-based processor from a plurality of vehicles, ground view image data of a map anomaly hotspot captured by the vehicles, wherein the map anomaly hotspot is an area described by a high-definition bird view map at which physical characteristics of the map anomaly hotspot as observed by the vehicles are inconsistent with a description for the area provided by the high-definition bird view map;
   converting the ground view image data to bird view image data using homography;
   removing outliers from the bird view image data;
   applying an error reduction algorithm for error reduction to the bird view image data with the removed outliers;
   stitching together a sequence of consecutive images from the bird view image data after error reduction to produce a high-definition image, wherein each of the consecutive images has been generated through converting the ground view image data to the bird view image data using homography, removing outliers from the bird view image data, and applying an error reduction algorithm for error reduction;
   comparing the stitched sequence of consecutive images to a pre-existing high-definition image of the map anomaly hotspot to determine revisions to the pre-existing high-definition image; and
   providing revised high-definition image data to an autonomous vehicle for use in navigating in an area near the map anomaly hotspot.

13. The method of claim 12, wherein converting the ground view image data to bird view image data using homography comprises:
   calculating a perspective transform from 4 pairs of corresponding corner points;
   representing the perspective transform by a transform matrix M; and
   applying the transform matrix M to an image data.

14. The method of claim 12, wherein removing outliers from the bird view image data comprises applying a RANSAC (Random Sample Consensus) algorithm to remove outliers from the bird view image data.

15. The method of claim 12, wherein applying an error reduction algorithm comprises performing image registration by matching features in the bird view image with features in the pre-existing high-definition image or using direct alignment methods to search for image alignments that minimize the sum of absolute differences between overlapping pixels.

16. The method of claim 15, wherein applying an error reduction algorithm comprises applying an iterative closest point (ICP) algorithm to iteratively revise a homography transformation used to reduce an error metric between the bird view image with outliers removed to the pre-existing high-definition image with outliers removed.

17. The method of claim 12, wherein stitching together a sequence of consecutive images from the bird view image data comprises:

determining an appropriate mathematical model relating pixel coordinates in one image to pixel coordinates in another;

estimating correct alignments relating collections of images;

matching distinctive features in each image to establish correspondences between images; and merging overlapping images.

18. The method of claim 12, further comprising constructing a three dimensional (3D) image of the map anomaly hotspot from the stitched sequence of consecutive images from the bird view image data after error reduction, wherein the constructing a three dimensional (3D) image of the map anomaly hotspot comprises:

identifying keypoint matches between images in the stitched sequence of consecutive images;

estimating a fundamental matrix for three-dimensional structures from the stitched sequence of consecutive images coupled with local motion signals using a structure from motion (SFM) range imaging algorithm;

finding dense matching between the three-dimensional structures using epipolar geometry;

determining dense point clouds for the three-dimensional structures using triangulation; and providing 3D dense point clouds to the AV or a different AV.

19. The method of claim 18, further comprising generating more dense point clouds from the dense point clouds using a patch-based multi view stereo (PMVS) algorithm and wherein providing 3D dense point clouds comprises providing the more dense point clouds to the AV or a different AV.

20. A non-transitory computer-readable medium having stored thereon instructions that when executed by a cloud-based processor cause the processor to perform a method for correcting high-resolution map images, the method comprising:

receiving, from a plurality of vehicles, ground view image data of a map anomaly hotspot captured by the vehicles, wherein the map anomaly hotspot is an area described by a high-definition bird view map at which physical characteristics of the map anomaly hotspot as observed by the vehicles are inconsistent with a description for the area provided by the high-definition bird view map;

converting the ground view image data to bird view image data using homography;

removing outliers from the bird view image data;

applying an error reduction algorithm for error reduction to the bird view image data with the removed outliers;

stitching together a sequence of consecutive images from the bird view image data after error reduction to produce a high-definition image, wherein each of the consecutive images has been generated through converting the ground view image data to the bird view image data using homography, removing outliers from the bird view image data, and applying an error reduction algorithm for error reduction;

comparing the stitched sequence of consecutive images to a pre-existing high-definition image of the map anomaly hotspot to determine revisions to the pre-existing high-definition image; and providing revised high-definition image data to an autonomous vehicle for use in navigating in an area near the map anomaly hotspot.

* * * * *